United States Patent
Natsume et al.

(10) Patent No.: US 7,151,482 B2
(45) Date of Patent: Dec. 19, 2006

(54) ANTENNA CONFIGURATION AND RADAR DEVICE INCLUDING SAME

(75) Inventors: Kazuma Natsume, Kariya (JP); Hiroshi Hazumi, Nagoya (JP)

(73) Assignee: Denso Corporation, Kariya (JP)

( * ) Notice: Subject to any disclaimer, the term of this patent is extended or adjusted under 35 U.S.C. 154(b) by 282 days.

(21) Appl. No.: 10/765,846

(22) Filed: Jan. 29, 2004

(65) Prior Publication Data

US 2004/0183719 A1 Sep. 23, 2004

(30) Foreign Application Priority Data

Feb. 10, 2003 (JP) ............................. 2003-032708

(51) Int. Cl.
G01S 13/06 (2006.01)
G01S 7/40 (2006.01)
H01Q 21/06 (2006.01)
G01S 13/93 (2006.01)
H01Q 1/32 (2006.01)

(52) U.S. Cl. .................. 342/147; 342/27; 342/28; 342/70; 342/118; 342/146; 342/165; 342/173; 342/174; 342/175; 342/195; 342/368; 343/711; 343/844; 343/876

(58) Field of Classification Search .............. 342/59, 342/82–103, 165–175, 195–197, 70–72, 342/118, 146, 147, 156–158, 128–133, 368–377, 342/417–449; 180/167–169; 343/844, 711–717, 343/876; 701/300, 301
See application file for complete search history.

(56) References Cited

U.S. PATENT DOCUMENTS

| 3,028,593 | A | * | 4/1962 | Alford | 342/158 |
| 3,268,890 | A | * | 8/1966 | Birge | 342/158 |
| 3,487,408 | A | * | 12/1969 | Farren | 342/158 |
| 3,513,471 | A | * | 5/1970 | Mooney, Jr. et al. | 342/91 |
| 3,618,090 | A | * | 11/1971 | Garrison | 342/147 |

FOREIGN PATENT DOCUMENTS

JP A-2001-99918 4/2001

* cited by examiner

Primary Examiner—Bernarr E. Gregory
(74) Attorney, Agent, or Firm—Posz Law Group, PLC

(57) ABSTRACT

A radar device (2) includes plural transmission antennas and plural reception antennas. The reception antennas constitute a reception-side antenna portion (20) and are arranged at an interval of d. The transmission antennas constitute a transmission-side antenna portion (18) and are arranged at an interval of $d'=d \times (n-1)$. The path length at which the electric wave is reflected from a target is identical between channels A9 and B1, and seventeen kinds of channels (A1 to A8, A9 or B1, B2 to B9) which are different in path length by every fixed distance are achieved. The data of the channels (A1 to A9 and B1 to B9) using different transmission antennas are respectively collected in different measuring cycles, and an error based on the time difference between the measuring cycles is corrected on the basis of a correction value calculated from the data of the channels A9, B1.

7 Claims, 8 Drawing Sheets

FIG. 4A

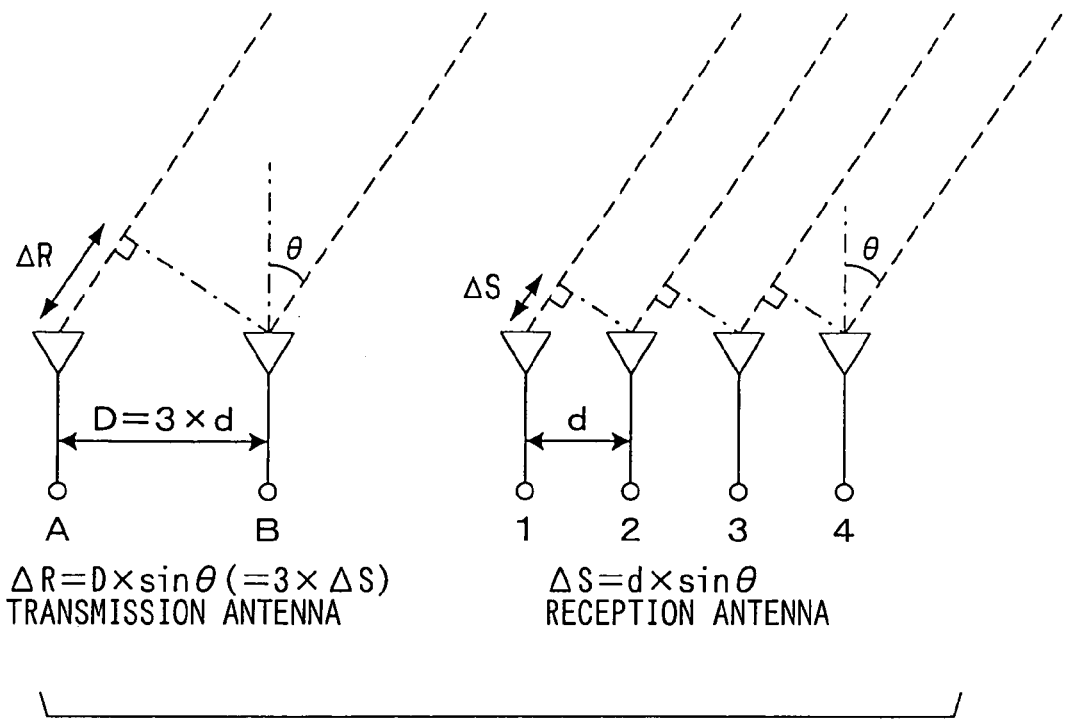

$\Delta R = D \times \sin\theta \, (= 3 \times \Delta S)$
TRANSMISSION ANTENNA $\Delta S = d \times \sin\theta$
RECEPTION ANTENNA

FIG. 4B

| CHANNEL | PATH LENGTH (PHASE) DIFFERENCE TO B4 | NOTE | |
|---------|--------------------------------------|------|---|
| A1 | $6 \times \Delta S$ | $(= \Delta R + 3 \times \Delta S)$ | |
| A2 | $5 \times \Delta S$ | $(= \Delta R + 2 \times \Delta S)$ | |
| A3 | $4 \times \Delta S$ | $(= \Delta R + 1 \times \Delta S)$ | |
| A4 | $3 \times \Delta S$ | $(= \Delta R)$ | SAME |
| B1 | $3 \times \Delta S$ | | |
| B2 | $2 \times \Delta S$ | | |
| B3 | $1 \times \Delta S$ | | |
| B4 | — | | |

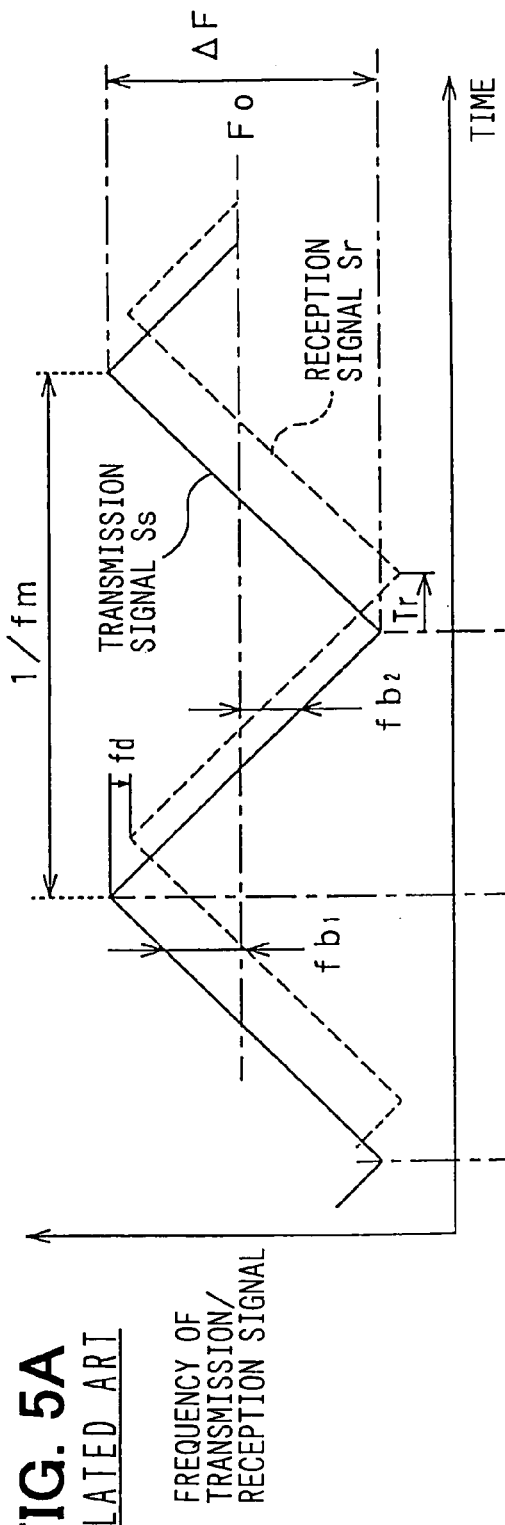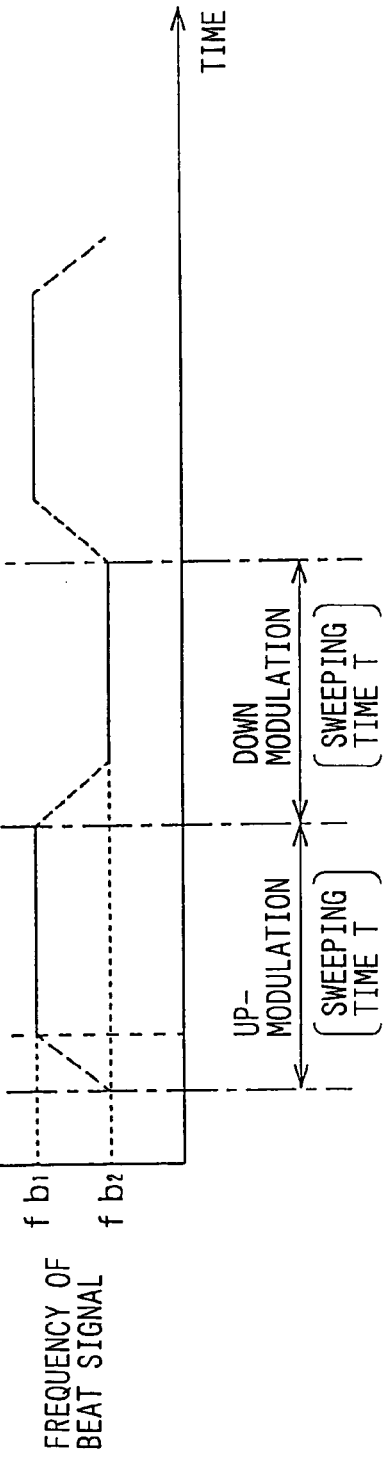
FIG. 5A
RELATED ART
FIG. 5B
RELATED ART

ANTENNA CONFIGURATION AND RADAR DEVICE INCLUDING SAME

CROSS REFERENCE TO RELATED APPLICATIONS

This application is based upon, claims the benefit of priority of, and incorporates by reference the contents of Japanese Patent Application No. 2003-32708 filed on Feb. 10, 2003.

FIELD OF THE INVENTION

The present invention relates to a radar device for determining the direction to a target reflecting electric wave by transmitting and receiving an electric wave from a plurality of antennas, and a method of arranging the plurality of antennas.

BACKGROUND OF THE INVENTION

Radar devices have been used as safety apparatuses in vehicles for avoiding collisions. One of these radar devices in particular is the Frequency Modulated Continuous Wave (FMCW) radar device. The FMCW radar device can detect the distance to and relative speed of a target at the same time and is suitable for miniaturization and low-cost design due to its simple construction.

In operation of the FMCW radar device, a transmission signal Ss is frequency modulated by a modulation signal having triangular waveform so that the frequency thereof is gradually increased and reduced linearly with respect to time. The transmission signal is transmitted as a radar wave as shown by the solid line in FIG. 5A, and the radar wave reflected from a target (hereinafter referred to as "reflection wave") is received. At this time, the reception signal Sr is delayed by only the time needed for the radar wave to reciprocate between the radar emission source and the target, that is, the time Tr corresponding to the distance to the target as shown by a broken line of FIG. 5A, and it is subjected to a Doppler shift by only the amount corresponding to the frequency fd corresponding to the relative speed to the target.

A beat signal corresponding to the differential frequency component between both the signals Sr and Ss is generated by mixing the reception signal Sr and the transmission signal Ss in a mixer as shown in FIG. 5B. From the frequency (hereinafter referred to as "beat frequency under up-modulation") fb1 of the beat signal when the frequency of the transmission signal Ss is increased, and the frequency (hereinafter referred to as "beat frequency under down-modulation") fb2 of the beat signal when the frequency of the transmission signal Ss is reduced, the frequency fr based on the delay time Tr and the Doppler shift frequency fd are represented by equations (1) and (2), respectively.

On the basis of these frequencies fr, fd, the distance R to the target and the relative speed V to the target are determined from the equations (3) and (4).

$$fr = (fb1 + fb2)/2 \quad (1)$$

$$fd = (fb1 - fb2)/2 \quad (2)$$

$$R = c \cdot fr/4 \cdot fm \cdot \Delta F \quad (3)$$

$$V = c \cdot fd/2 \cdot Fo \quad (4)$$

Here, c represents the propagation velocity of electric wave, fm represents the modulation frequency of the transmission signal, $\Delta F$ represents the frequency variation width of the transmission signal, and Fo represents the center frequency of the transmission signal.

The beat frequencies fb1, fb2 are generally specified by using signal processing. Specifically, a beat signal is sampled and Fast Fourier Transformation (FFT) processing is carried out in each of the up/down modulation operation to achieve a frequency distribution of the beat signal during every modulation operation. The frequency components having a peak signal intensity are set as the beat frequencies fb1, fb2.

The sampling frequency fs of the beat signal should be at least twice as high as the upper limit frequency of the beat signal. Accordingly, the frequency variation width $\Delta F$ and the modulation period 1/fm, etc. are set so that the frequency component of the beat signal generated on the basis of the reflection wave from a target located within a predetermined detection range is located within a signal band below the upper limit frequency thereof.

However, a reflection wave from a fixed building having a larger size as compared with a vehicle, such as a pedestrian bridge, a building in the neighborhood of a road or the like, is sufficiently large. The reflection wave is sufficiently large even when it is from an object located at a remote place and out of the detection range (hereinafter referred to as "remote target"). Therefore, when a reflection wave from such a remote target is received, the beat signal contains frequency components above the upper limit frequency as shown in FIG. 6A. FIG. 6A is a graph showing the frequency distribution of the beat signal. When this beat signal is subjected to sampling and then FFT processing, the frequency components above the upper limit frequency based on the remote target are turned back with the half frequency of the sampling frequency as an axis of symmetry as shown by a broken line of FIG. 6A, so that a dummy peak appears within the signal band. Therefore, it is erroneously detected that the target exists within the detection range.

Furthermore, even when no remote target as described above exists, if the processing is carried out by sampling the beat signal, the noise floor of the signal band rises up and thus the SN ratio is lowered by the noise components turned back into the signal band as shown in FIG. 6B, so that the detection capability is lowered.

Therefore, it is generally carried out that an antialiasing filter is provided at the output side of the mixer to remove the noise components out of the signal band, particularly the frequency components above the half frequency of the sampling frequency from the beat signal generated in the mixer, thereby suppressing the effect of the turn-back occurring through the FFT processing as described above and as shown in FIG. 6C.

Furthermore, in order to enlarge the target detecting range of the radar device or measure the direction to a target location with high precision, there is also provided an electron scan type radar device in which a reflection wave from a target is received by a plurality of reception antennas and the direction to the target is determined on the basis of the phase difference or amplitude difference of the reception signal which occurs in accordance with the positions of the respective reception antennas.

In this type of radar device, for constituting the device cheaply, only one receiver (mixer) for generating the beat signal is equipped to plural reception antennas. The reception signals from the respective reception antennas are subjected to time-division processing by only the single mixer. In the following description, each combination pattern of antennas at the transmission and reception sides which are used to transmit/receive radar wave will be referred to as "channel".

Furthermore, not only the reception antennas, but also plural transmission antennas are equipped so that many channels can be set by a small number of antennas (see JP-A-2001-99918 (paragraphs [0026] to [0029]), for example).

However, when an antialiasing filter is used when the reception signals from the plural channels are subjected to the time division processing by the mixer, an accurate detection result can not be achieved.

That is, the time-divisionally multiplexed reception signal to be supplied to the mixer contains a higher harmonic wave of an integer multiple of a frequency fx when the channel switching period is represented by 1/fx, so that the beat signal generated from the mixer is also added with frequency components based on the higher harmonic wave to thereby broaden the frequency band. However, the antialiasing filter described above also removes information necessary to separate the multiplexed signals of the respective channels from one another, so that the signals of the respective channels are superposed on one another and an accurate signal level cannot be sampled.

Furthermore, in the case where plural antennas are equipped to the transmission side to increase the number of channels, at the channel switching time, the sampling of the beat signal of a new channel must be awaited until at least a time needed for the radar wave to go and return at the maximum detection distance (hereinafter referred to as "transmission standby time") has elapsed to prevent sampling of the beat signal based on the radar wave of the preceding channel.

Therefore, the sampling interval per channel and the sweeping time T when the frequency of the transmission signal is modulated are lengthened, so that the problem caused by aliasing described above is more liable to occur and also the detectable area of the relative speed is narrowed.

That is, when the direction to a target is determined on the basis of the difference in phase or amplitude of the reception signals of plural channels, it is required to switch all the channels in turn in order to secure synchronicity of signals to be compared with each other. However, since a transmission standby time must be inserted every time the transmission antenna (in the figure, two transmission antennas A, B) is switched as shown in FIG. 7A, a time needed to select all the channels A1 to An, B1 to Bn, that is, a sampling time interval per channel is excessively longer by at least the time corresponding to the product of the transmission standby time and the number of transmission antennas as compared with the case where a single transmission antenna is used, and further the sweeping time T is greatly lengthened.

FIGS. 8A–8B are graphs showing variation of a detectable area for the distance R and the relative speed V when the frequency variation width $\Delta F$ is set to a fixed value (200 MHz) and the sweeping time T is varied by varying the sampling frequency fs per channel (modulation A: 185 kHz, modulation B: 370 kHz). As shown in FIG. 8B, it is apparent that when the sweeping time T is longer (modulation A); the detectable range of the relative speed V is narrowed. However, the maximum distance is achieved for fr=fs/2, and the maximum relative speed is achieved for fd=fs/4. In this case, the sampling number Dpc per channel is set to 512.

SUMMARY OF THE INVENTION

The present invention has been implemented to overcome the above problems, and has an object to provide a radar device for transmitting and receiving an electric wave while switching between a plurality of transmission antennas and a plurality of reception antennas successively, thereby suppressing aliasing of a reception signal from a remote target and receiver noise, and enabling detection of a target having a large relative velocity.

In order to attain the above object, an antenna arrangement method according to a first aspect of the present invention is used for a radar device that has a plurality of channels, each of which includes a combination of one of plural transmission antennas and one of plural reception antennas and transmits an receives an electric wave through each channel to determine the direction to a target.

A first interval between the transmission antennas and a second interval between the reception antennas is set so that in channel groups each comprising channels using the same transmission antennas, each of the channel groups using transmission antennas adjacent to each other contains at least one channel having a path length at which an electric wave goes to and returns from a target, the path length being equal to that of any one of the channels of the other channel group, and also the number of channels which are varied in path length by every fixed distance over all the channels is larger than the number of the reception antennas.

Preferably, the number of the transmission antennas is set to m (m≧2), the number of the reception antennas is set to n (n≧2), the interval between the reception antennas is set to d and the interval between the transmission antenna is set to D=d×k (2≦k≦n−1). Here, all of m, n, k are integers. In this case, each of the channel groups using the adjacent transmission antennas contains (n−k) channels, each of which has the same path length as any one of the channels of the other channel group, and also {(m−1)×k+n} kinds of channels which are different in path length by every fixed distance exist over all the channels.

However, in order to use the antennas efficiently, it is preferable that k=n−1, that is, each of the channel groups using the adjacent transmission antennas contains only one channel having the same path length as any one of the channels of the other channel group.

For example, if two (m=2) transmission antennas A, B and four (n=4) reception antennas 1 to 4 are used as shown in FIG. 4A, the interval between the transmission antennas is set to D=3×d (in the case of k=n−1). As compared with the interval d, D, the distance to the target is sufficiently large. Therefore, assuming that the reflection wave from the target is incident to each antenna at the same angle θ, the electric wave path extending from the target to each of the reception antennas 1 to 4 is different between the adjacent reception antennas by every $\Delta S$ (=d×sin θ), and the electric path extending from each transmission antenna A, B to the target is different between both the transmission antennas by only $\Delta R$ (=D×sin θ)=3×$\Delta S$.

Accordingly, the differences in path length of the going and returning paths to the target among the respective channels A1 to A4, B1 to B4, each of which comprises a combination of one of the transmission antennas and one of the reception antennas, are shown in FIG. 4B with the channel B4 having the shortest path length as a standard.

That is, the channel A4 having the shortest path length among the channels A1 to A4 constituting the channel group using the transmission antenna A, and the channel B1 having the longest path length among the channels B1 to B4 constituting the channel group using the transmission antenna B have the same path length, so that seven kinds of channels which are different in path length by every ΔS are achieved over all the channels.

According to a radar device according to a second aspect of the present invention, a transmitting/receiving device (transceiver) transmits and receives an electric wave by using any one of a plurality of channels. Each of the plural channels includes one of the transmission antennas and one of the reception antennas which are arranged according to the antenna arrangement method described above, and provides a beat signal achieved by mixing the transmission signal and the reception signal.

At this time, a switching control device successively switches the transmission antenna to be used to transmit electric wave every predetermined measuring cycle, and also during the measuring cycle, successively switches the reception antenna used to receive the electric wave every predetermined channel switching interval. Accordingly, the multiplexed signal achieved by time-divisionally multiplexing the beat signals of the channels of the channel group using the same transmission antenna is supplied from the transceiver in the same measuring cycle. The signal processing device determines the direction to at least a target reflecting electric wave on the basis of the data achieved by sampling the multiplexed signal. However, in the signal processing device, correcting means detects an error occurring between the channel groups different in measuring cycle on the basis of the data of channels which are equal to each other in path length, corrects the data of the respective channels so that the error is offset, and determines the direction to the target on the basis of the corrected data.

That is, the channels which are set to have the same path length are used in different measuring cycles, and thus the error corresponding to the time difference of the measuring cycles occurs between the data collected from both channels. The data are corrected so that this error is offset, whereby synchronicity between the data collected in the different measuring cycles can be compensated and then the signal processing can be performed on the assumption that the signals in the respective measuring cycles are regarded as being detected at the same time.

As described above, according to the present invention, the switching operation of the transmission antenna is not carried out every time the switching operation of the reception antenna is finished, but a transmission antenna is fixed in the same measuring cycle and the channel switching operation is repeatedly carried out among only the channels of the channel group using the transmission antenna concerned. Therefore, no transmission standby time is inserted in the course of the measuring cycle, and thus the sampling interval per channel can be greatly shortened.

It is preferable that the error to be corrected by the correcting means contains at least phase. Furthermore, in place of the phase, amplitude may be corrected. For example, when the data collected every measuring cycle are subjected to the Fast Fourier Transform processing, a complex vector value indicating amplitude and phase is achieved as a result of the processing. Therefore, the vector ratio between the channels having the same path length is set as a correction amount and the data achieved in one measuring cycle is multiplied by the correction amount, whereby the amplitude and the phase can be simultaneously corrected.

Furthermore, when the scalar difference (that is, the amplitude difference) of the vectors is small, the phase difference is calculated from the complex vector, the phase difference thus calculated is set as a correction amount, and then the phase of the data achieved in one measuring cycle are corrected by the correction amount.

When the radar device is constructed as a FMCW type radar device in which the transceiver transmits/receives an electric wave whose frequency is modulated to vary like a triangular waveform with respect to time, the switching control device is preferably equipped with constitutional modulation inclination varying means for varying the inclination of the frequency modulation by varying at least one of the number of reception antennas under switching control or the length of the channel switching interval.

More particularly, according to the present invention, as described above, the sampling interval per channel can be shortened and then the modulation inclination can be sharply set as compared with the conventional device, so that the degree of freedom of the modulation inclination can be enhanced. Therefore, according to the present invention, for example when the beat signal based on reflection wave to be detected and the beat signal based on reflection wave which is not required to be detected are overlapped with each other in frequency, the frequencies of both the beat signals are controlled by varying the modulation inclination, whereby both the beat signals can be separated. Therefore, the beat signal based on the reflection wave to be detected can be surely extracted.

BRIEF DESCRIPTION OF THE DRAWINGS

The above and other objects, features and advantages of the present invention will become more apparent from the following detailed description made with reference to the accompanying drawings. In the drawings:

FIGS. 4A–4B are diagrams showing the relationship between an antenna arrangement interval and the path length to a target;

FIGS. 5A–5B is a diagram showing operating principles of FMCW;

DETAILED DESCRIPTION OF THE PREFERRED EMBODIMENTS

Preferred embodiments according to the present invention will be described hereunder with reference to the accompanying drawings.

[First Embodiment]

Figure 1:
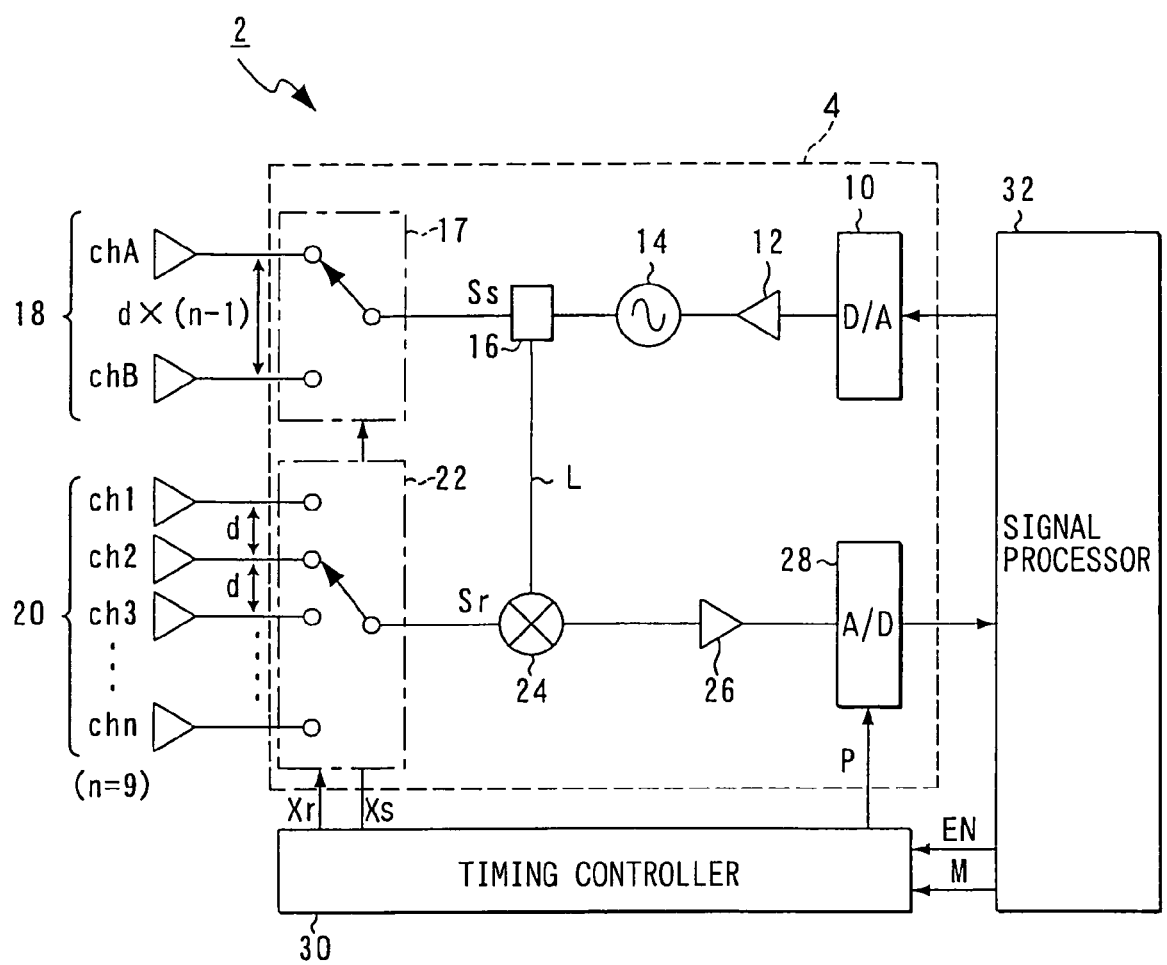
FIG. 1 is a block diagram showing the construction of a vehicle-mount type radar device.

FIG. 1 is a block diagram showing the overall construction of a vehicle-mount type radar device according to this embodiment.

As shown in FIG. 1, a radar device 2 according to this embodiment includes a transceiver 4. The transceiver 4 includes a D/A converter 10 for generating a modulation signal having a triangular waveform in response to a modulation instruction, a voltage controlled oscillator (VCO) 14 to which the modulation signal generated in the D/A converter 10 is applied through a buffer 12 so that the oscillation frequency thereof is varied in conformity with the modulation signal, a divider 16 for dividing the output power of the VCO 14 into a transmission signal Ss and a local signal L, a transmission-side antenna portion 18 comprising transmission antennas of m (in this embodiment, m=2) for emitting radar waves corresponding to the transmission signal Ss, and a transmission switch 17 for alternatively selecting any one of the m transmission antennas in accordance with a transmission selecting signal Xs and supplying the transmission signal Ss to the transmission antenna thus selected.

The transceiver 4 of the radar device 2 also includes a reception-side antenna portion 20 comprising a plurality of reception antennas (in this embodiment, n=9) for receiving radar waves and a reception switch 22 for alternatively selecting any one of then reception antennas in accordance with a reception selecting signal Xr and supplying a reception signal Sr from the reception antenna thus selected to the rear stage. The transceiver 4 also includes a mixer 24 for mixing the reception signal Sr supplied from the reception switch 22 with the local signal L to generate a beat signal and an amplifier 26 for amplifying the beat signal generated in the mixer 24. An A/D converter 28 is included for sampling the beat signal amplified by the amplifier 26 in conformity with a timing signal P and then converting the signal thus sampled to digital data.

The radar device 2 also includes a timing controller 30 for generating the transmission selecting signal Xs, the reception selecting signal Xr and the timing signal P. Finally, the radar device 2 also includes signal processor 32 for outputting the modulation instruction to the D/A converter 10 and carrying out the signal processing on the sampled data of the beat signal picked up through the A/D converter 28 to determine the distance and relative speed to a target reflecting the radar waves and the direction to the location at which the target exists.

In the following description, the transmission antennas will be hereunder referred to as "channel A, channel B", and the reception antennas j (j=1 to 9) will be hereunder referred to as "channel j", and each channel comprising the combination of one of the transmission antennas and one of the reception antennas will be hereunder described as "channels A1 to A9, B1 to B9".

Here, VCO 14 generates a high-frequency signal of millimetric-wave band (extremely high frequency band), which is modulated by a triangular-waveform modulation signal so that the frequency thereof is gradually increased or reduced linearly with respect to time. The center frequency Fo of the signal is preferably set to 76.5 GHz while the frequency variation width $\Delta F$ is set to 100 MHz.

The reception antennas constituting the reception-side antenna portion 20 are arranged in a row at a fixed interval d=7.2 mm, and the transmission antennas constituting the transmission-side antenna portion 18 are arranged at an interval d'=d×(n−1)=57.6 mm.

Accordingly, the path length at which the radar wave goes and returns between the radar device and the target is identical between the channel A9 and the channel B1, and seventeen kinds of channels (A1 to A8, A9 or B1, B2 to B9) which are different in path length by every fixed distance are achieved.

Figure 2:
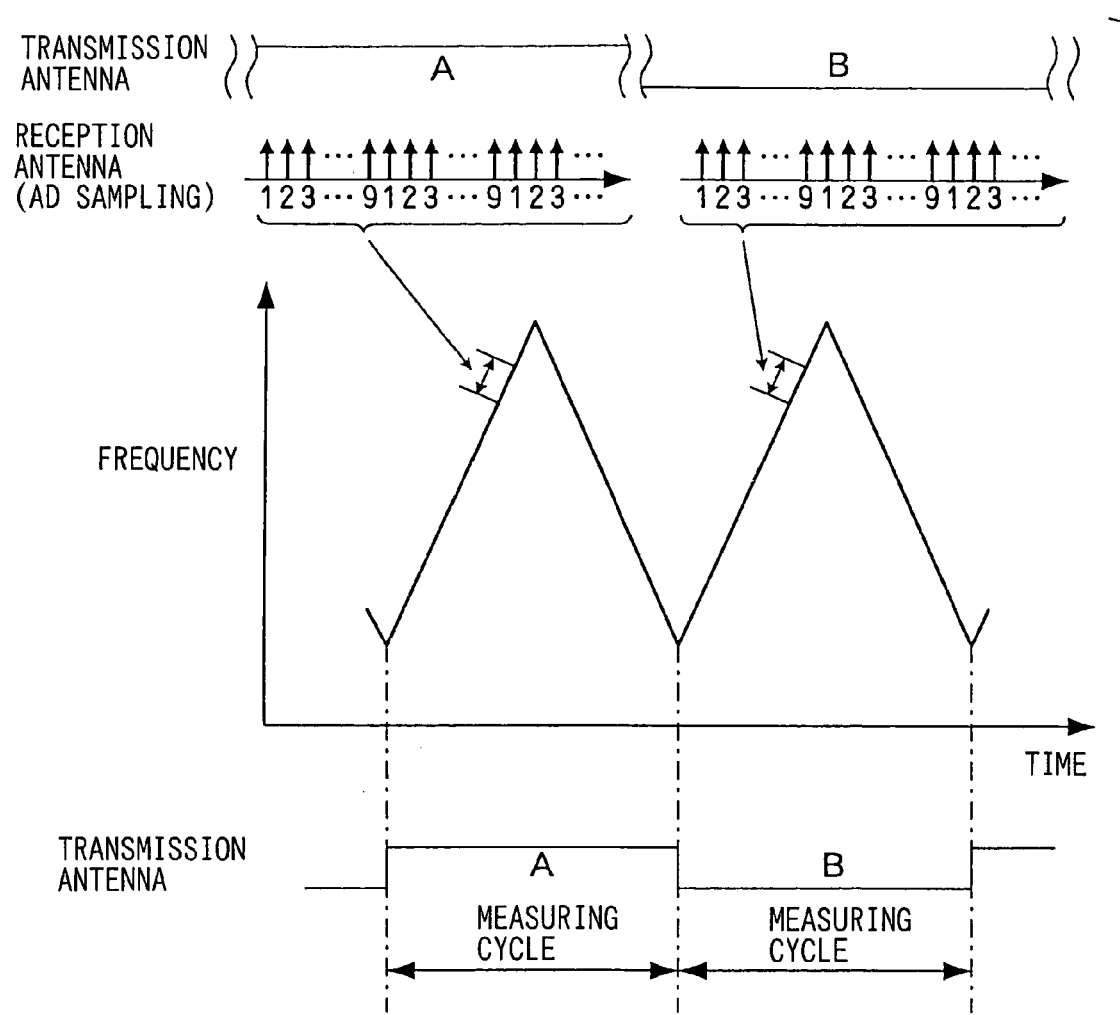
FIG. 2 is a diagram showing an antenna switching method.

Next, the timing controller 30 generates the timing signal P comprising a pulse array of a fixed period 1/fx and also generates the reception selecting signal Xr for driving the reception switch 22 so that each of the transmission antennas is selected in turn and repetitively in synchronism with the timing signal P as shown in FIG. 2. The period 1/fx of the timing signal P is set to a value greater than the longer one of the switching period of the reception switch 22 and the conversion period of the A/D converter 28.

Furthermore, the timing controller 30 generates the transmission selecting signal Xs for driving the transmission switch 17 so that the transmission antennas are alternately selected every period (hereinafter referred to as "measuring cycle") corresponding to the sum of the transmission standby time and the time needed to output a train of pulses of n×Dpc of the timing signal P when Dpc represents the sampling number per channel (512 in this embodiment).

Still furthermore, the timing controller 30 is designed so that the start and stop operation thereof is controlled on the basis of an operation allowance signal EN, and the period 1/fx of the timing signal and further the increase/reduction of the measuring cycle can be controlled on the basis of a mode signal M. However, in this embodiment, the modulation period (the period of the triangular wave) of the transmission signal generated by VCO 14 is controlled to be coincident with the measuring cycle at all times. Generally, the modulation inclination of the transmission signal is controlled by the mode signal M.

In this embodiment, the period 1/fx (that is, the measuring cycle) of the timing signal is varied on the basis of the mode signal M, however, the number of reception antennas to be selected by the reception switch 22 may be varied. In this case, however, it is required to successively take off reception antennas as non-selection targets from the side of the reception antenna corresponding to the channel 1 in the case of the channel A or from the side of the reception antenna corresponding to the channel 9 in the case of the channel B. That is, when only one reception antenna to be selected is eliminated, the A1 channel and the B9 channel are taken off as non-selection targets from the candidates, and the remaining 15 channels are used.

The signal processor 32 is mainly constructed by a well-known microcomputer comprising CPU, ROM and RAM, and includes an operation processing device (for example, DSP) for executing Fast Fourier Transform (FFT) processing on data received from the A/D converter 28. It executes the processing of generating such a modulation instruction as to modulate the frequency of the transmission signal (up-section/down-section) by the amount corresponding to one period while the transmission selecting signal Xs is output, and also executes the target information detecting processing of determining the distance and relative speed to the target and the direction to the location of the target on the basis of the sampling data of the beat signal achieved through the A/D converter 28.

In the radar device 2 according to this embodiment thus constructed, the power of the high-frequency signal generated in accordance with the modulation signal by VCO 14 as described above is divided by the divider 16 to generate the transmission signal Ss and the local signal L. The transmission signal Ss thus generated is supplied to any one of the transmission antennas constituting the transmission-side antenna portion 18, which is selected by the transmission switch 17, and transmitted as a radar wave through the transmission antenna thus selected.

The radar wave (reflection wave) which is emitted from the transmission antenna and reflected from the target and then returns is received by all the reception antennas constituting the reception-side antenna portion 20, and only the reception signal Sr from the reception antenna selected by the reception switch 22 is supplied to the mixer 24. At this time, the mixer 24 mixes the reception signal Sr with the local signal L from the divider 16 to generate the beat signal. The beat signal amplified by the amplifier 26 is sampled in accordance with the timing signal P in the A/D converter and taken into the signal processor 32.

The time-divisionally multiplexed beat signal of the channels A1 to A9 and the time-divisionally multiplexed beat signal of the channels B1 to B9 are alternately supplied every modulation period of the transmission signal (measuring cycle) by the mixer 24.

Figure 3:
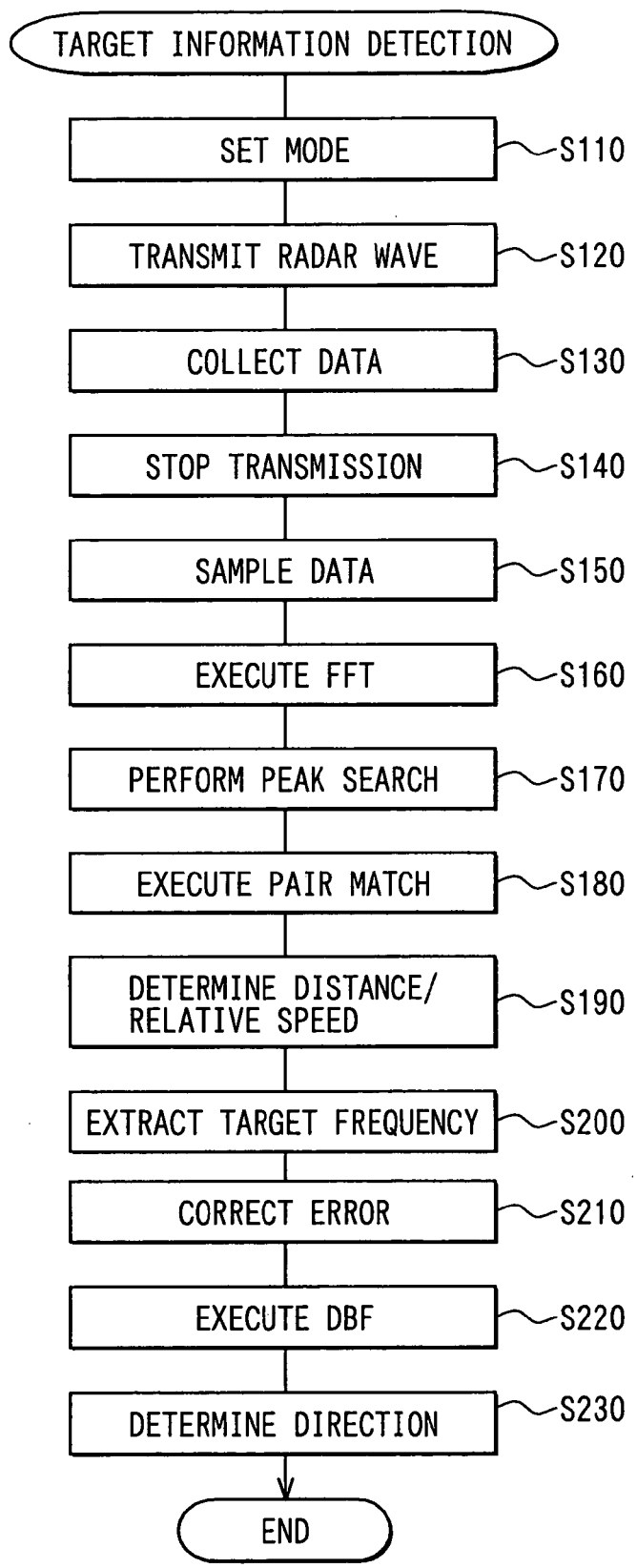
FIG. 3 is a flowchart showing the content of processing executed by a signal processor.
Figure 6A:
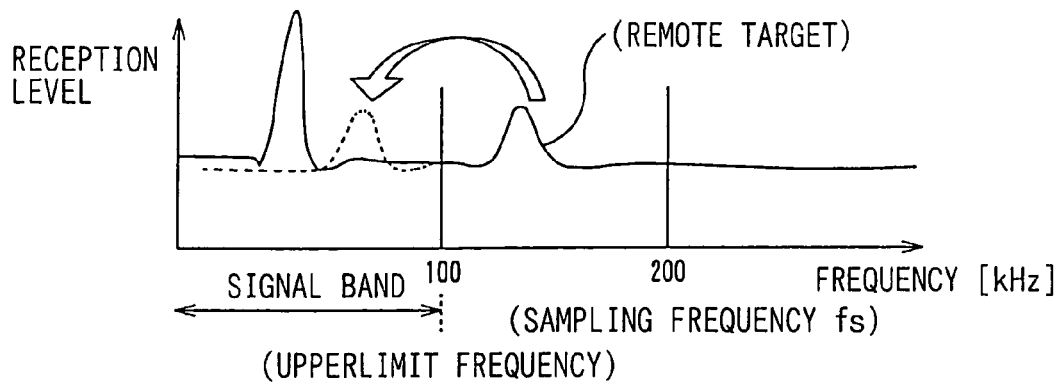
FIGS. 6A–6C are diagrams showing the effect of an anti-aliasing filter according to related art.
Figure 6B:
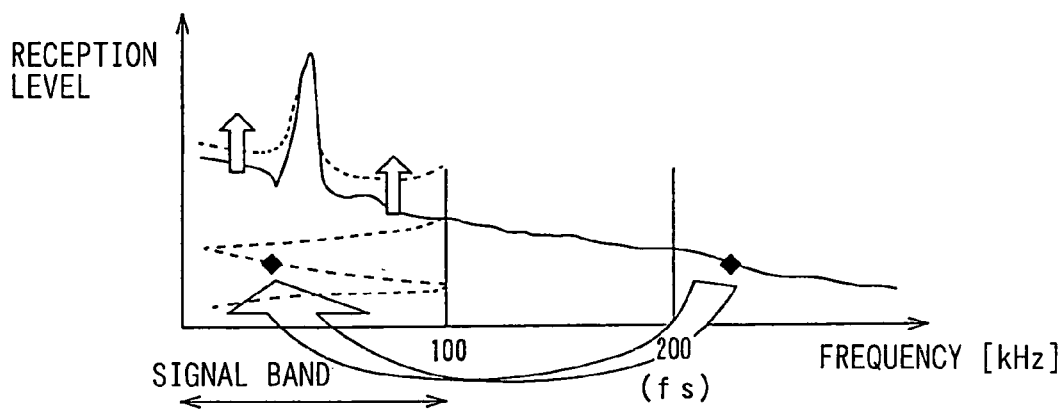
Figure 6C:
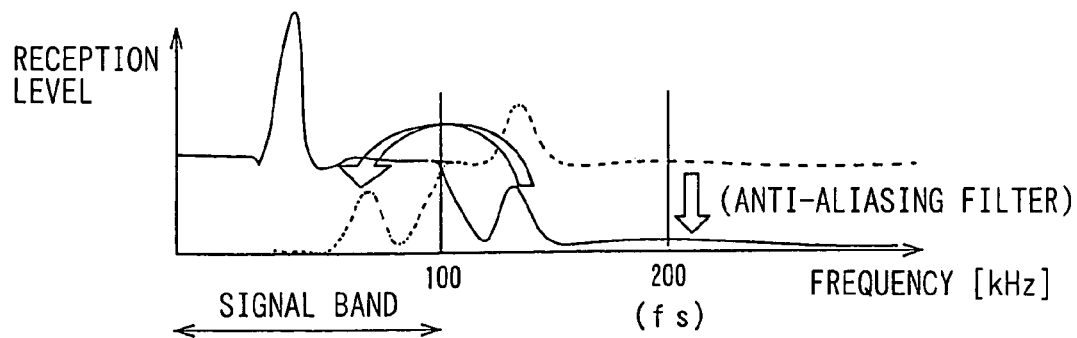
Figure 7A:
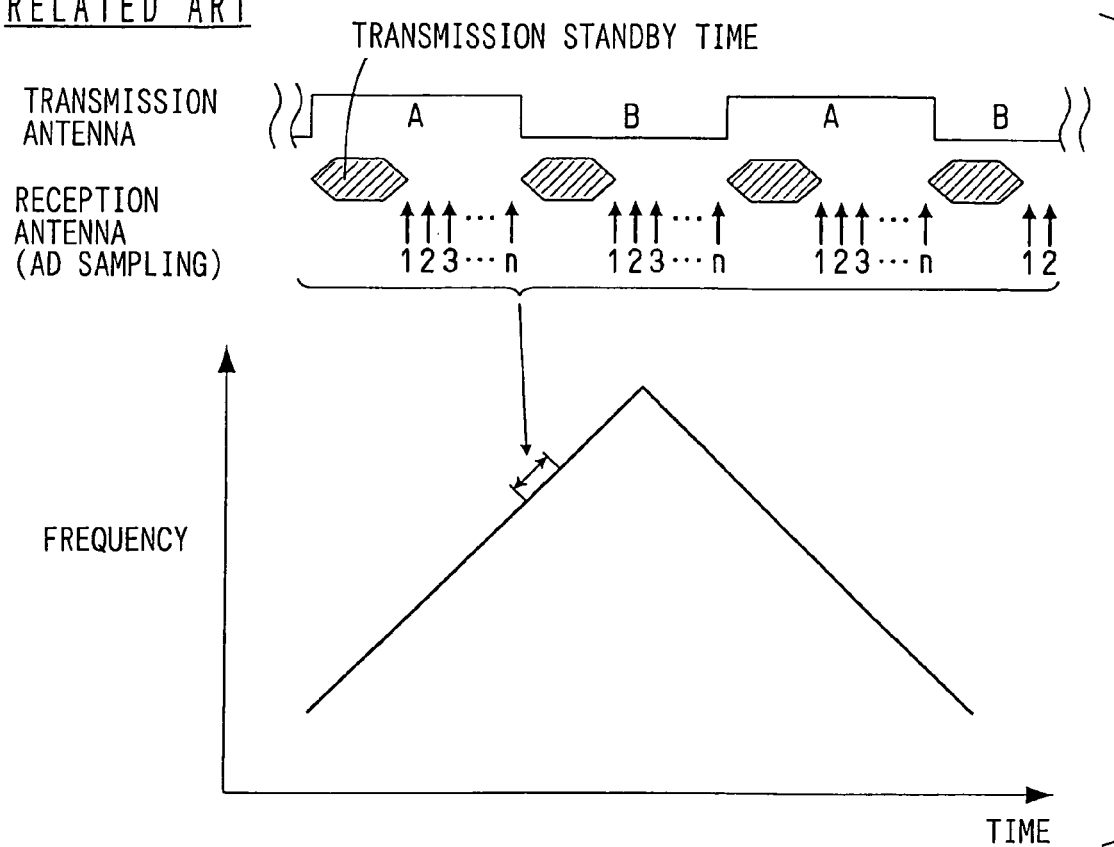
FIGS. 7A–7B are diagram showing a related art antenna switching method.
Figure 7B:
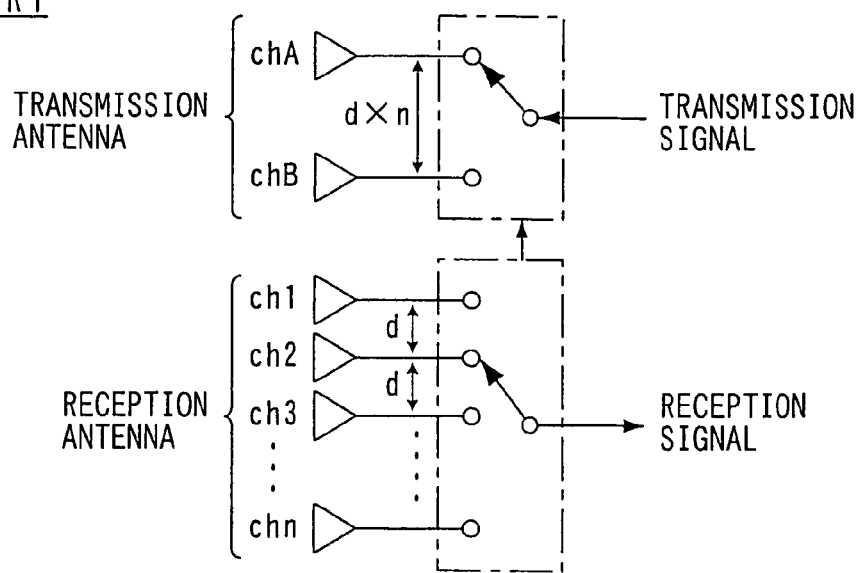
Figure 8A:
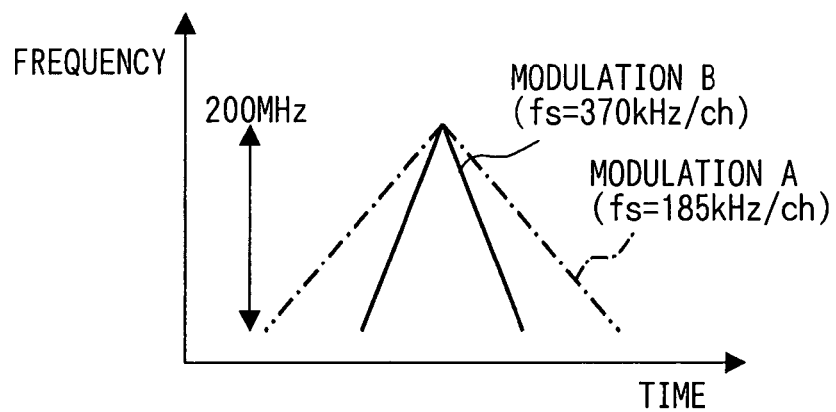
FIGS. 8A–8B are graphs showing the relationship between a modulation period (sweeping period) and a detection range.
Figure 8B:
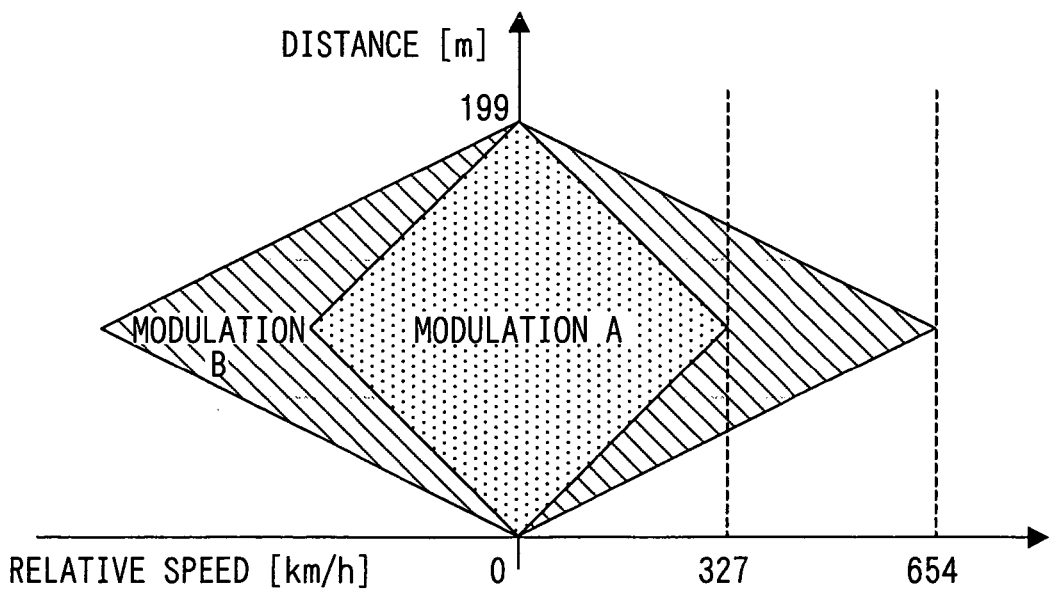

Here, the target information detecting processing executed by the signal processor 32 will be described with reference to the flowchart of FIG. 3. When this processing is started, the mode signal M is first output to the timing controller 30 to set a mode (S110). In this mode setting, when it is judged on a past detection result that a beat signal based on reflection wave from a target to be detected is embedded or expected to be embedded in a beat signal based on reflection wave from another target, a modulation inclination of the transmission signal is set to prevent this embodiment of the beat signal.

The transmission of the radar wave is begun by supplying the modulation signal to VCO 14 through the D/A converter 10 (S120), and the beat signal is sampled through the A/D converter 28 to collect data (S130). In this case, the data corresponding to the two measurement cycles are collected so that the data on all the channels A1 to A9 and B1 to B9 are collected. When all the necessary data are collected, the supply of the modulation signal to VCO 14 is stopped, so that the transmission of the radar wave is stopped (S140).

Subsequently, the data is sampled at S150. More particularly, the collected data are separated every channel A1 to A9, B1 to B9 at S150. Based the data thus separated, the frequency analysis processing (in this case, the FFT processing) is executed every channel A1 to A9, B1 to B9 and every up/down section, thereby determining a power spectrum of the beat signal (S160).

Subsequently, there is carried out peak search processing of specifying the frequency of a component having the peak signal intensity from the frequency distribution of the beat signal achieved every section through the above frequency analysis processing (S170). The frequency distribution used for the peak search processing may be the frequency distribution of any one of plural channels or an average frequency distribution achieved by averaging the frequency distributions of the channels A1 to A9 or the channels B1 to B9.

When it is found as a result of the peak search processing that plural peaks exist, pair match processing of specifying the frequency components which are paired between both the modulations by comparing the signal intensity or phase of the frequency components is executed (S180). The frequencies of the signal components paired through the pair match processing are set as beat frequencies fb1, fb2, and the distance R and relative speed V to the target are calculated by using the equations (3), (4) for every pair (S190).

Subsequently, the data associated with the target extracted in the previous step S180 (the frequency component represented by complex vector) is extracted on the basis of the frequency analysis result of each channel A1 to A9, B1 to B9 (S200). The ratio of the data of the channels A9 and B9 out of these extracted data ([A9]/[B1], where [i] represents the data of the channel i) is calculated, and the data of the channels B2 to B9 are multiplied by the above data ratio serving as a correction amount, thereby correcting the error of the phase or amplitude based on the time difference between the measuring cycles (S210).

Subsequently, digital beam forming (DBF) processing is executed on the basis of the data of the channels A1 to A9 and the corrected data of the channels B2 to B9 (S220). The direction to the location of the target is determined on the basis of the above processing result (S230), and then this processing is finished.

In this embodiment, [A9]/[B1] is set as the correction amount. However, the data of the channels A1 to A8 may be multiplied by [B1]/[A9] as a correction amount to correct the data of the channels A1 to A8, and then the DBF processing may be executed on the basis of the corrected data of the channels A1 to A8 and the data of the channels B1 to B9. In place of DBF, other direction determining algorithms such as ESPRIT, etc. may be used.

In the device construction shown in FIG. 1 according to this embodiment, the timing controller 30 corresponds to switching control device and the signal processor 32 corresponds to the signal processing device. The signal processor 32 executing the process of S210 corresponds to correcting means, and the process of S110 corresponds to varying means.

As described above, in the radar device 2 of this embodiment, the data collected in different measuring cycles (the data of the channels A1 to A9/the data of the channels B1 to B9) are corrected by using the correcting amount achieved from the data of the channels A9, B1 which are set so as to have the same path length, so that they can be regarded as being detected in the same measuring cycle and subjected to the signal processing together.

Therefore, according to the radar device 2 of this embodiment, it is not required to collect the data of all the channels in one measuring cycle, and it is sufficient to use only the data of the channels using the same transmission antenna. Therefore, no transmission standby time is inserted in the course of the measuring cycle, and thus the sampling interval per channel can be greatly shortened.

That is, the half of the sampling frequency fs can be set to a sufficiently higher value than the frequency component based on the remote target, and the frequency component based on the remote target is prevented from being turned into the signal band through the FFT processing, so that the remote target can be prevented from being erroneously detected as a target within the detection range.

Furthermore, the noise components turned into the signal band of the beat signal through the FFT processing can be reduced, and the rise-up of the noise floor within the signal band can be suppressed, so that the detection capability of the beat frequencies fb1, fb2 can be enhanced.

Still furthermore, since the sampling interval per channel is shortened, the continuing time of the measuring cycle (sweeping time) can be shortened, and then the modulation inclination of the frequency of the transmission signal can be set to a large value. That is, the detectable area of the relative speed is enlarged, and thus a target having a higher relative speed can be detected.

Still furthermore, according to this embodiment, since the sampling interval per channel is shortened, the degree of freedom when the modulation inclination of the frequency of the transmission signal is varied to increase based upon enhancement of the mode signal M, and for example when the peak frequencies based on different targets are overlapped, they can be surely separated from each other. Therefore, the detection performance of the target can be enhanced.

Therefore, the present disclosure concerns a novel method for arranging a plurality of transmission antennas 18 and a plurality of reception antennas 20 for a radar device 2 equipped with a plurality of channels, wherein each of the plurality of channels is comprised of a combination of one of the plurality of transmission antennas 18 and one of the plurality of reception antennas 20, wherein the radar device 2 is for determining a direction to a target by transmitting an electric wave to the target and receiving the electric wave reflected from the target through each of the plurality of channels. A first predetermined interval D is disposed between the transmission antennas 18 and a second predetermined interval d is disposed between the reception antennas 20. The plurality of channels are arranged into channel groups comprising channels using a same transmission antenna of the plurality of transmission antennas 18, wherein each channel group includes at least one channel having a path length equal to the path length of at least another channel in another channel group using an adjacent transmission antenna, wherein a number of channels varied in path length by a fixed distance overall the plurality of channels is larger than a number of the plurality of reception antennas 20. The number of the plurality of transmission antennas 18 is equal to an integer m greater than or equal to 2. The number of the plurality of reception antennas 20 is equal to an integer n greater than or equal to two. The first predetermined interval between the reception antennas is set to d and the second predetermined interval between the transmission antenna is set to D, wherein D is equal to d×k, wherein $2 \leq k \leq n-1$, wherein m and k represent integers. Each of the plurality of channel groups using adjacent transmission antennas includes (n−k) channels, each of which has the same path length as any one of the channels of the other channel group. The number of channels varied in path length by a fixed distance over all the plurality of channels is equal to $[(m-1) \times k + n]$.

A novel radar device 2 according to the present disclosure includes a transceiver 4 for transmitting and receiving an electric wave over one of a plurality of channels, each of the plurality of channels comprising one of the plurality of transmission antennas 18 and one of the plurality of reception antennas 20 arranged according to the above methodology, and for generating a beat signal by mixing the transmission signal and the reception signal. The radar device also includes a switching control device 30 for successively switching a transmission antenna to be used to transmit the electric wave every predetermined measuring cycle, and for successively switching the reception antenna used to receive the electric wave every predetermined channel switching interval, whereby a multiplexed signal achieved by time-divisionally multiplexing the beat signals of the channels of the channel group using the same transmission antenna is supplied from the transceiver 4 in the same measuring cycle. The radar device 2 also includes a signal processing device 32 for determining the direction to a target on the basis of data achieved by sampling the multiplexed signal supplied from the transceiver 4, wherein the signal processing device 32 includes correcting means for detecting an error occurring between the channel groups different in measuring cycle on the based upon data from channels equal to each other in path length and correcting the data of the respective channels so that the error is offset.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An antenna configuration for a radar device, comprising:
   a plurality of transmission antennas over which an electric wave is transmitted to a target, the plurality of transmission antennas being evenly spaced from one another by a first predetermined interval (D);
   a plurality of reception antennas over which the transmitted wave is received when reflected from a target, the plurality of reception antennas being evenly spaced from one another by a second predetermined interval (d); and
   a plurality of channels each formed by a combination of one of the plurality of transmission antennas and one of the plurality of reception antennas, the plurality of channels being arranged into channel groups comprising channels using a same one of the plurality of transmission antennas, wherein
   each of the channel groups includes at least one channel having a path length equal to the path length of at least another channel in another channel group using an adjacent transmission antenna, and
   a number of channels varied in path length by a fixed distance over all the plurality of channels is larger than a number of the plurality of reception antennas.

2. The antenna configuration of claim 1, wherein:
   the number of the plurality of transmission antennas is equal to an integer m greater than or equal to two;
   the number of the plurality of reception antennas is equal to an integer n greater than or equal to two;
   the second predetermined interval between the transmission antennas (D) is equal to (d)×k, $2 \leq k \leq n-1$, where n and k are integers;
   each of the plurality of channel groups using adjacent transmission antennas includes (n−k) channels, each of which has the same path length as any one of the channels of the other channel group; and
   the number of channels varied in path length by a fixed distance over all the plurality of channels is equal to $[(m-1) \times k + n]$.

3. The antenna configuration of claim 1, wherein each of the channel groups includes the at least one channel having a path length equal to the path length of the at least another channel in another channel group using an adjacent transmission antenna to enable calculation of an error correction value based on a time difference between channel measuring cycles.

4. A radar device comprising:
   a plurality of transmission antennas over which an electric wave is transmitted to a target, the plurality of transmission antennas being evenly spaced from one another by a predetermined interval (D);
   a plurality of reception antennas over which the electric wave that is reflected from the target is received, the plurality of reception antennas being evenly spaced from one another by a second predetermined interval (d), wherein
      a plurality of channels formed by the plurality of transmission antennas and the plurality of reception antennas, each of the plurality of channels being formed by a combination of one of the plurality of transmission antennas and one of the plurality of reception antennas, the plurality of channels being arranged into channel groups including channels using a same one of the plurality of transmission antennas,
      each of the channel groups includes at least one channel having a path length equal to a path length of at least another channel in another channel group using an adjacent transmission antenna, and a number of channels varied in path length by a fixed distance over all the plurality of channels is larger than a number of the plurality of reception antennas;

a transceiver for transmitting and receiving the electric wave over one of the plurality of channels, and for generating a beat signal by mixing the transmitted and reflected electric wave;

a switching control device for successively switching a transmission antenna to be used to transmit the electric wave every predetermined measuring cycle, and for successively switching a reception antenna used to receive the reflected electric wave every predetermined channel switching interval, whereby a multiplexed signal achieved by time-divisionally multiplexing the beat signals of the channels of the channel group using the same transmission antenna is supplied from the transceiver in the same measuring cycle; and a signal processing device for determining the direction to the target on the basis of data achieved by sampling the multiplexed signal supplied from the transceiver, wherein the signal processing device includes correcting means for detecting an error occurring between the channel groups different in measuring cycle based upon data from channels equal to each other in path length, and correcting the data of the respective channels so that the error is offset.

5. The radar device according to claim 4, wherein the error to be corrected by the correcting means includes at least phase.

6. The radar device according to claim 5, wherein the transceiver is for transmitting and receiving an electric wave whose frequency is modulated to vary as a triangular waveform with respect to time, and the switching control device includes modulation inclination varying means for varying an inclination of the frequency modulation by varying at least one of the number of reception antennas under switching control and the channel switching interval.

7. The radar device according to claim 4, wherein the transceiver is for transmitting and receiving the electric wave having a frequency that is modulated to vary as a triangular waveform with respect to time, and the switching control device includes modulation inclination varying means for varying the inclination of the frequency modulation by varying at least one of the number of reception antennas under switching control and the channel switching interval.

* * * * *